US012789983B2

(12) United States Patent
Moline et al.

(10) Patent No.: US 12,789,983 B2
(45) Date of Patent: Nov. 10, 2026

(54) AIRCRAFT WHEEL BRAKING DEVICE

(71) Applicant: SAFRAN LANDING SYSTEMS, Velizy-Villacoublay (FR)

(72) Inventors: Sylvain Moline, Moissy-Cramayel (FR); Sébastien Heude, Moissy-Cramayel (FR); Pierre Maladot, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 661 days.

(21) Appl. No.: 18/268,635

(22) PCT Filed: Dec. 20, 2021

(86) PCT No.: PCT/EP2021/086887

§ 371 (c)(1),
(2) Date: Jun. 21, 2023

(87) PCT Pub. No.: WO2022/136319

PCT Pub. Date: Jun. 30, 2022

(65) Prior Publication Data

US 2024/0043114 A1 Feb. 8, 2024

(30) Foreign Application Priority Data

Dec. 21, 2020 (FR) ....................................... 2013821

(51) Int. Cl.
*B64C 25/42* (2006.01)
*B60B 7/01* (2006.01)
(Continued)

(52) U.S. Cl.
CPC .................................... *B64C 25/42* (2013.01)

(58) Field of Classification Search
None
See application file for complete search history.

(56) References Cited

U.S. PATENT DOCUMENTS 3,829,162 A * 8/1974 Stimson .................. B60T 1/065 301/6.5
3,958,833 A * 5/1976 Stanton ................... F16D 65/84 301/6.2
(Continued)

FOREIGN PATENT DOCUMENTS

EP 3 702 275 A1 9/2020

OTHER PUBLICATIONS

International Search Report for PCT/EP2021/086887 dated Mar. 18, 2022.

*Primary Examiner* — Robert A. Siconolfi
*Assistant Examiner* — James K Hsiao
(74) *Attorney, Agent, or Firm* — Sughrue Mion, PLLC

(57) ABSTRACT

A braking device for braking a wheel of an aircraft, a hub of which is mounted rotatably on an axle includes a stack of discs threaded on a torque tube which is attached to the axle and equipped internally with a heat shield extending opposite an outer surface of the hub facing the stack of discs to protect the hub from heat radiation generated by the stack of discs. The heat shield includes a tubular body which is coaxial to the torque tube and retaining tabs which are resiliently deformable and secured to the tubular body, each of the retaining tabs and an inner surface of the torque tube including additional raised portions to engage with one another so as to axially immobilize the heat shield inside the torque tube.

13 Claims, 5 Drawing Sheets

(51) Int. Cl.
*B60T 5/00* (2006.01)
*F16D 65/84* (2006.01)

(56) References Cited

U.S. PATENT DOCUMENTS

| | | | | | |
|---|---|---|---|---|---|
| 4,084,857 | A * | 4/1978 | VanderVeen | B60B 19/10 | 188/264 G |
| 4,856,619 | A | 8/1989 | Petersen | | |
| 5,002,342 | A * | 3/1991 | Dyko | B60C 23/18 | 188/264 G |
| 5,107,968 | A * | 4/1992 | Delpassand | B60C 23/18 | 188/264 G |
| 5,199,536 | A * | 4/1993 | Clark | F16D 55/36 | 188/264 G |
| 5,236,249 | A * | 8/1993 | Han | B60C 23/18 | 301/6.91 |
| 5,248,013 | A * | 9/1993 | Hogue | F16D 55/36 | 188/264 G |
| 5,323,881 | A * | 6/1994 | Machan | F16D 55/36 | 188/18 A |
| 5,851,056 | A * | 12/1998 | Hyde | B60B 19/10 | 188/264 G |
| 5,862,890 | A * | 1/1999 | Long | F16D 55/36 | 188/73.36 |
| 6,752,248 | B2 * | 6/2004 | Berwanger | F16D 55/36 | 188/73.31 |
| 7,051,845 | B2 * | 5/2006 | Thorp | F16D 65/78 | 188/71.6 |
| 7,546,910 | B2 * | 6/2009 | Thorp | F16D 55/36 | 188/71.6 |
| 8,157,062 | B2 * | 4/2012 | Enright | F16D 65/78 | 188/71.6 |
| 8,668,276 | B2 * | 3/2014 | Hall | B64C 25/36 | 301/6.2 |
| 9,103,393 | B2 * | 8/2015 | Houser | F28F 13/00 | |
| 9,267,557 | B2 * | 2/2016 | Boyle | F16D 55/227 | |
| 9,908,375 | B2 * | 3/2018 | Baden | F16D 65/847 | |
| 10,145,429 | B1 * | 12/2018 | Whittle | B64C 25/44 | |
| 10,330,163 | B2 * | 6/2019 | French | B64C 25/42 | |
| 10,967,961 | B2 * | 4/2021 | Leiva | F16D 55/36 | |
| 11,231,081 | B2 * | 1/2022 | Hoglund | F16D 65/78 | |
| 11,572,159 | B2 * | 2/2023 | Leiva | B64C 25/36 | |
| 11,668,363 | B2 * | 6/2023 | Moline | B64C 25/36 | 301/6.2 |
| 11,884,250 | B2 * | 1/2024 | Ke | F16D 65/186 | |
| 12,140,192 | B2 * | 11/2024 | Todd | B64C 25/34 | |
| 2003/0213657 | A1 * | 11/2003 | Haydon | B60T 1/065 | 188/71.5 |
| 2012/0241557 | A1 | 9/2012 | Coty | | |
| 2014/0020873 | A1 * | 1/2014 | Houser | F16D 65/84 | 165/135 |
| 2015/0298498 | A1 * | 10/2015 | Seradarian | B60B 7/0066 | 301/10.1 |
| 2017/0106973 | A1 | 4/2017 | Baden et al. | | |

* cited by examiner

AIRCRAFT WHEEL BRAKING DEVICE

CROSS REFERENCE TO RELATED APPLICATIONS

This application is a National Stage of International Application No. PCT/EP2021/086887 filed Dec. 20, 2021, claiming priority based on French Patent Application No. 2013821 filed Dec. 21, 2020, the contents of each of which being herein incorporated by reference in their entireties.

The present invention relates to the field of braking, and more specifically, controlling heat transfers during braking.

BACKGROUND OF THE INVENTION

An aircraft landing gear generally comprises a strut having a first end connected to a structure of the aircraft and a second end provided with a shaft or axle on which a wheel is mounted so as to rotate. The wheel comprises a rim connected by a web to a hub which receives the shaft of the strut by means of bearings and which defines, with the rim, a space wherein a stack of brake discs is disposed. The stack of discs alternately comprises stator discs immobilised rotatably on a torque tube coaxial to the hub of the wheel and rotor discs secured rotatably on the rim of the wheel. Actuators, for example hydraulic jacks, are arranged to exert a press force on the stack of discs via a hydraulic ring so as to brake the wheel.

The release of heat following the friction of the discs can be significant (in particular, during the landing of the aircraft where the energy to be dissipated is maximum, due to the mass and the high speed of the aircraft at the time of the landing) and lead to an overheating of the brake and of its environment. This problem is approached, in particular, in document EP-A-3702275.

Safety considerations impose, in particular, a maximum temperature of around 200° C. at the hub to ensure its mechanical strength, but also to avoid any excessive heating of the bearings and of their sealing system that could cause a premature breaking of these.

It is thus known to dispose a heat shield between the hub and the torque tube to protect said hub of the heat radiation generated by the stack of discs.

Certain heat shields extend from the web of the wheel to an internal shoulder of the torque tube forming a tube base on which the heat shields are screwed to be held in position inside the torque tube.

If such heat shields prove to be effective, they however require that the torque tube is provided with a base to enable their attachment on said torque tube, which increases the mass of the torque tube, but also complexifies its shape and therefore its manufacture, its mounting and its maintenance.

Other heat shields have an end sandwiched between the hydraulic ring and a bottom of the torque tube, and an opposite end secured to a free edge of the torque tube by screwing via a connecting part. These heat shields extend over the whole length of the torque tube, which tends to increase the heating of said torque tube. What is more, the existence of the connecting part connecting the heat shield to the free edge of the torque tube has the effect of increasing the cost and the mass of the assembly.

Moreover, such heat shields require the use of tools to screw the heat shield to the torque tube, which causes a preparation and a significant mounting time.

Aim of the Invention

The invention therefore aims to propose a heat shield making it possible to overcome, at least in part, the above-mentioned problems.

SUMMARY OF THE INVENTION

In view of achieving this aim, the invention proposes a braking device of an aircraft wheel, a hub of which is mounted rotatably on an axle. The device comprises a stack of discs threaded on a torque tube which is attached to the axle and equipped internally with a heat shield extending opposite an outer surface of the hub facing the stack of discs to protect said hub from heat radiation generated by the stack of discs.

According to the invention, the heat shield comprises a tubular body coaxial to the torque tube and a plurality of retaining tabs which are resiliently deformable and secured to the tubular body, each of the retaining tabs and an inner surface of the torque tube comprising additional raised portions to engage with one another so as to axially immobilise the heat shield inside the torque tube.

The heat shield is thus resiliently retained in the torque tube. The retaining tabs therefore enable a mounting without tools of the heat shield inside the torque tube, but also decrease its mounting time, while limiting the cost and the mass of the assembly.

According to a particular feature, the tubular body extends from a web of the wheel and a free edge of the hub.

Thus, the heat shield only partially covers the inner surface of the torque tube, which tends to limit the heating of said torque tube during braking.

Particularly, the tubular body comprises spherical cap-shaped stamps facing the inner surface of the torque tube to form punctual contacts with said inner surface of the tube.

These stamps make it possible to ensure the mechanical strength of the heat shield while limiting the heat conduction between the main body and the torque tube.

According to a particular feature, the retaining tabs are evenly distributed about the central axis of the tubular body.

Particularly, the inner surface of the torque tube comprises a radially projecting step and each of the retaining tabs comprises a fastening raised portion of said step and, preferably, at least one of the retaining tabs comprises a transverse groove arranged to simultaneously engage a front face and a rear face of the step.

Advantageously, the groove has a depth less than a height of the step, such that said retaining tab is removed from the inner surface of the torque tube limiting the heat conduction between the shield and the torque tube.

Particularly, at least one of the retaining tabs comprises an inclined end portion forming a ramp on which the step bears and slides during the introduction of the heat shield in the torque tube by causing the resilient deformation of the retaining tab until passing the step.

Particularly, the retaining tabs define a diameter less than an inner diameter of the torque tube and greater than the outer diameter of the tubular body.

Particularly, at least one of the retaining tabs is formed integrally with the main body.

The invention also relates to an aircraft wheel equipped with such a braking device.

The invention also relates to an aircraft landing gear comprising at least one such wheel.

The invention further relates to an aircraft provided with such a landing gear.

BRIEF DESCRIPTION OF THE DRAWINGS

The invention will be best understood in the light of the description below, which is purely illustrative and non-limiting, and must be read regarding the accompanying drawings, among which.

DETAILED DESCRIPTION OF THE INVENTION

The invention is, in this case, described in application to an aircraft comprising at least one main landing gear having a strut, a first end of which is articulated to a structure of the aircraft and a second end is provided with an axle, on which are least one wheel is mounted rotatably.

Figure 1:
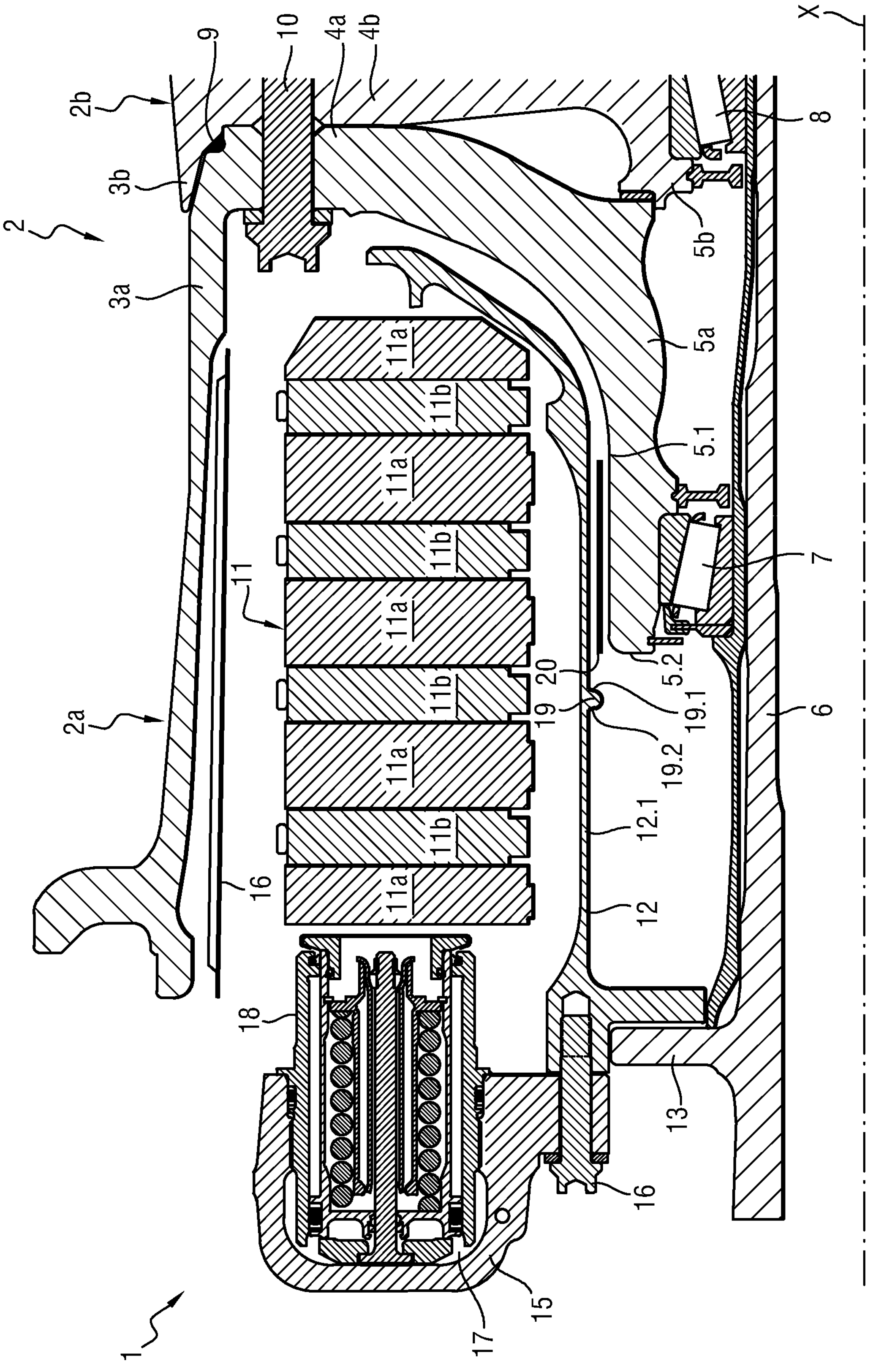
FIG. 1 is an axial cross-sectional view of a wheel equipped with a braking device according to a particular embodiment of the invention.

In reference to FIG. 1, the invention relates to a braking device, generally referenced as 1, equipping the wheel 2 of the main landing gear of the aircraft.

The wheel 2 comprises two half-wheels 2*a*, 2*b* which each include an annular rim 3*a*, 3*b* connected by a web 4*a*, 4*b* to a half-hub 5*a*, 5*b* pivotally received on an axle or spindle 6 by means of a bearing 7, 8. The half-wheel 2*a* includes a groove formed in an edge of the rim 3*a* and having a sealing gasket 9 arranged therein so that it becomes elastically compressed between the half-wheels 2*a*, 2*b* once they are assembled together.

The half-wheels 2*a*, 2*b* are moved towards each other in a direction parallel to an axis of rotation X of the wheel 2 and comprise surface ranges to ensure that the two half-wheels 2*a*, 2*b* are properly positioned relative to each other. The half-wheels 2*a*, 2*b* are held in position by bolts 10 extending into borne orifices facing one another in the webs 4*a*, 4*b*.

In a manner known per se, the bolts 10 are screwed and tightened in order to assemble together the half-wheels 2*a*, 2*b* after a tyre (not represented) has been mounted on the rims 3*a*, 3*b*. In this position, the sealing gasket 9 is resiliently compressed between the half-wheels 2*a*, 2*b* and thus prevents the gas contained in a volume delimited by the tyre and the half-wheels 2*a*, 2*b* from escaping to the outside of the wheel 2.

The braking device 1 comprises brake discs 11, including the stator discs 11*a* and the rotor discs 11*b*, which are alternatively stacked against one another on a torque tube 12 attached to a collar 13 of the axle. The torque tube 12 and the stack of discs 11 extend inside the half-wheel 2*a* in an annular space defined by an inner surface of the rim 3*a*, the web 4*a* and an outer surface of the half-hub 5*a* extending opposite the inner surface of the rim 3*a*.

The stator discs 11*a* are fixed in rotation with respect to the axle 6 and the rotor discs 11*b* comprise axial peripheral notches each receiving a section of a bar (which cannot be seen in the figure) attached to the inner surface of the rim 3*a*. The bars extend about an axis parallel to the axis of rotation X of the wheel 2 and ensure a coupling in rotation of the rotor discs 11*b* with the rim 3*a* about said axis X.

The braking device 1 further comprises a hydraulic ring 15 attached to an end of the torque tube 12 by means of screws 16. The ring 15 comprises a plurality of cavities 17 distributed, in this case, evenly about the axis of rotation X of the wheel 2. Each of the cavities 17 receives an actuator 18 selectively exerting a braking force against a first stator disc 11*a* of the stack of discs 11 via a pressurised hydraulic fluid circulating inside the ring 15. The ringed distribution of the actuators 18 makes it possible to evenly distribute the braking force over the whole surface of the first stator disc 11*a*.

The braking device 1 is equipped with a tubular heat shield 20 extending coaxially to the torque tube between a cylindrical inner surface 12.1 of said torque tube 12 and an outer surface 5.1 of the half-hub 5*a* facing the stack of discs 11 to protect said half-hub 5*a* from the heat radiation caused by the friction of the discs 11 during a braking of the wheel 2.

Figure 2:
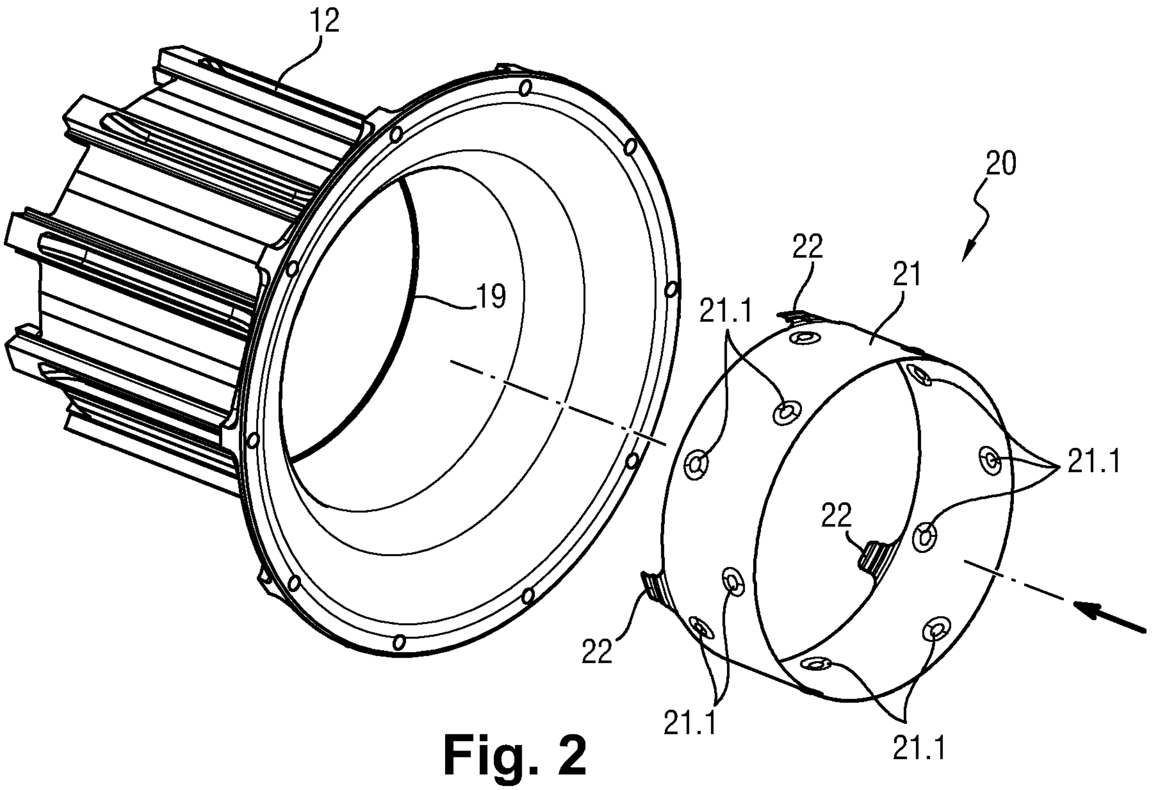
FIG. 2 is a perspective view of the torque tube and of the heat shield of the braking device illustrated in FIG. 1.
Figure 3:
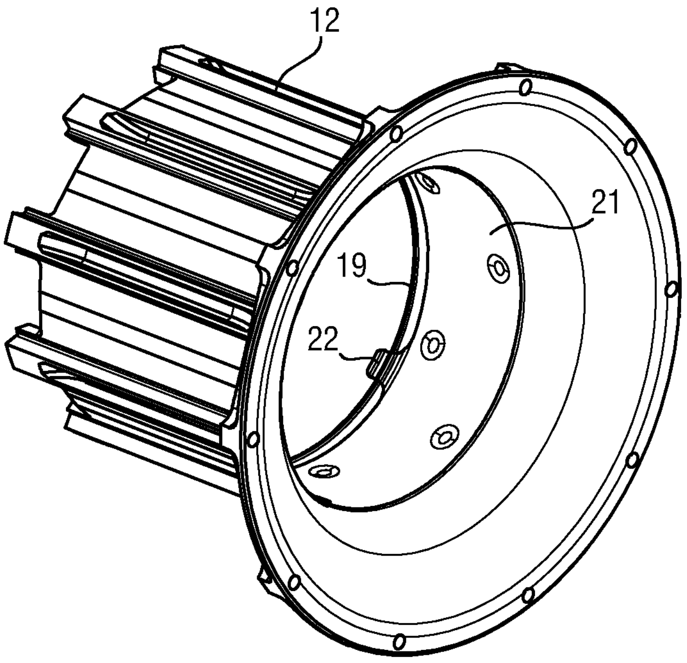
FIG. 3 is a perspective view of the heat shield illustrated in FIG. 2 in position inside the torque tube.

As illustrated in FIGS. 2 and 3, the heat shield 20 comprises a cylindrically-shaped main body 21 having an outer diameter slightly less than the diameter of the inner surface 12.1 of the torque tube 12. The main body 21 extends from the web to a free edge 5.2 of the half-hub 5*a*, such that the heat shield 20 only partially covers the inner surface 12.1 of the torque tube 12. The main body 21 comprises a plurality of stamps 21.1, in this case, symmetrically distributed about the central axis of the main body 21. The stamps 21.1 are spherical cap-shaped with convexity oriented towards the inner surface 12.1 of the torque tube 12 and form punctual contacts with said inner surface 12.1 of the torque tube 12 to ensure the mechanical strength of the heat shield 20 while limiting the heat conduction between the main body 21 and the torque tube 12.

The heat shield 20 also comprises three resiliently deformable retaining tabs 22 which bear against an annular step 19 extending radially projecting from the inner surface 12.1 of the torque tube 12 to resiliently hold the heat shield 20 in position inside the torque tube 12.

The step 19 comprises a front face 19.1 and a rear face 19.2 which are both truncated-shaped and which are brought together by their large base.

The retaining tabs 22 mainly extend axially projecting from an edge of the main body 21 towards the hydraulic ring and are, in this case, evenly distributed around this edge.

Figure 4:
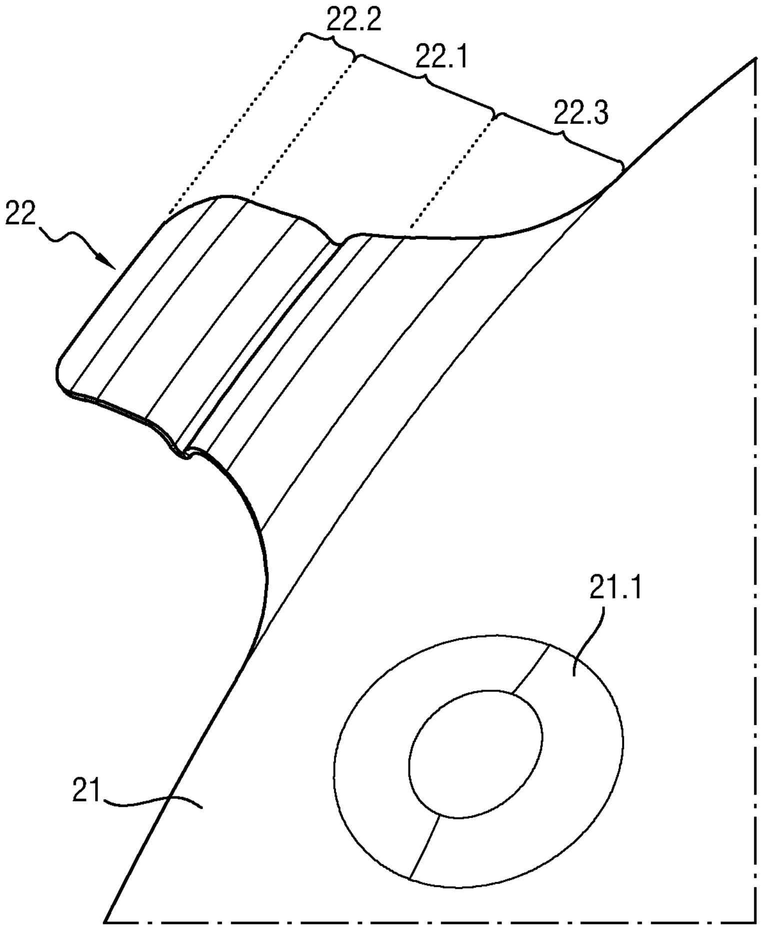
FIG. 4 is a detailed view of one of the retaining tabs of the heat shield illustrated in FIG. 2.

According to FIG. 4, the retaining tabs 22 are arranged to resiliently retract on contact with the step 19 during the introduction of the heat shield 20 in the torque tube 12, and to oppose the axial movement of the main body 21 once the heat shield 20 is in position in said torque tube 12. To this end, the retaining tabs 22 have a mainly rectilinear central portion 22.1 provided in its middle with a stamp forming a transverse groove 23 arranged to have flanks simultaneously and respectively engaging with the front face 19.1 and the rear face 19.2 of the step 19, and an inclined end portion 22.2 which forms a ramp on which the front face 19.1 of the step 19 bears and slides during the introduction of the heat shield 20 in the torque tube 12 by causing the resilient deformation of the retaining tabs 22 until passing the step 19. The flanks of the groove 23 and the faces 19.1, 19.2 of the step 19 form, with the central axis, an angle greater than that formed between the end portion 22.2 and said central axis, such that the flanks of the groove 23 and/or the faces 19.1, 19.2 of the step 19 cannot serve as a ramp facilitating a deformation of the retaining tabs 22 towards the central axis when an axial force is exerted on the heat shield 20.

The retaining tabs 22 also have a connecting portion 22.3 connecting the central portion 22.1 to the edge of the main body 21.

It will be noted that the groove 23 has a depth less than the height of the step 19, such that the flanks of the groove are forced against the front and rear faces of the step 19 respectively when the heat shield 20 is in position in the torque tube, and that, when the retaining tabs 22 are in a rest state, the central portions 22.1 of the retaining tabs 22 have an outer diameter slightly greater than that of the main body 21 and slightly less than the diameter of the inner surface 12.1 of the torque tube 12, such that the retaining tabs 22 are in contact with the torque tube 12 only at the grooves 23, which makes it possible to limit any deterioration of the torque tube 12 during its operation.

Figure 5:
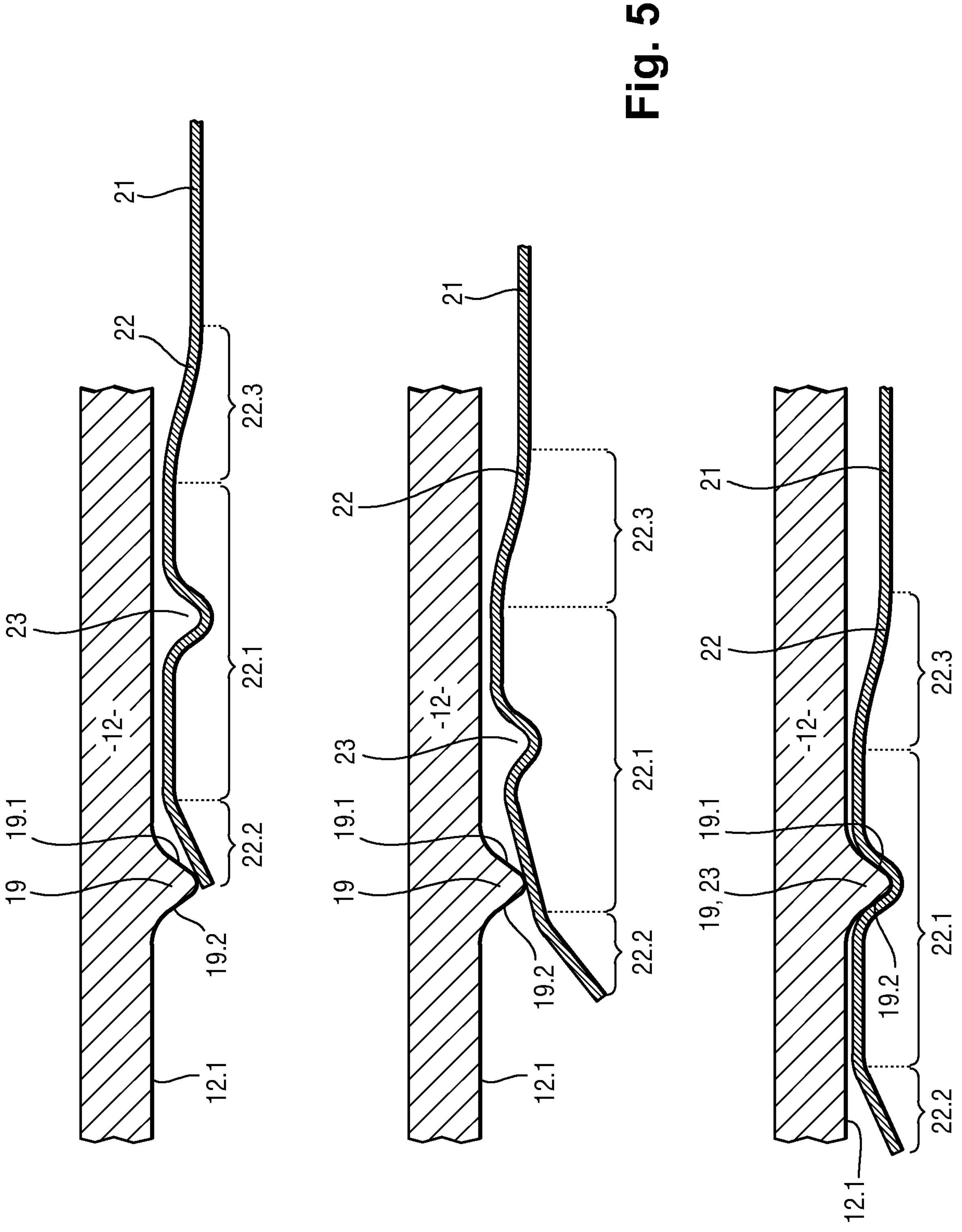
FIG. 5 schematically represents the resilient interlocking of the retaining tab illustrated in FIG. 4 on the torque tube.

The mounting of the heat shield 20 on the torque tube 12 will now be detailed, regarding FIG. 5.

The heat shield 20 is first introduced inside the torque tube 12 coaxially to that until the end portions 22.2 of the retaining tabs 22 come into contact with the front face 19.1 of the step 19 of the torque tube 12. By continuing the insertion of the heat shield 20 in the torque tube 12, the step 19 exerts, on the end portions 22.2, a radial force tending to deform the retaining tabs 22 to bring the retaining tabs 22 towards the central axis until the step 19 is engaged in the grooves 23 axially immobilising the main body 21 inside the torque tube 12.

If the inclination of the end portions 22.2 makes it possible to facilitate the mounting of the heat shield 20, it will be noted that it also makes it possible to facilitate its dismounting. Indeed, the operator can easily deform the retaining tabs by exerting an axial force under the end portions 22.2, and thus releasing the step 19 from the grooves 23 while exerting an extraction force on the heat shield 20.

Figure 6:
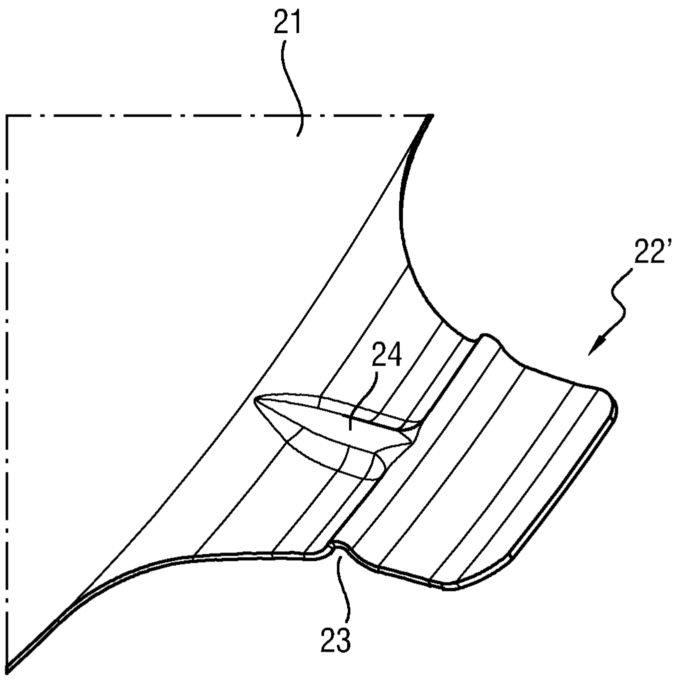
FIG. 6 is a detailed view of a variant of the retaining tab illustrated in FIG. 4.

FIG. 6 illustrates a retaining tab 22' which is no other than a variant of the retaining tab 22 illustrated in FIG. 4. The retaining tab 22' differs from the retaining tab 22 in that it comprises a stiffener 24 formed by a stamp extending between the edge of the main body 21 and the groove 23 in order to increase its rigidity.

Naturally, the invention is not limited to the embodiment described, but covers any variant coming within the scope of the invention such as defined by the claims.

The heat shield 20 can be made of a thermally insulating material, like for example steel, stainless steel, titanium, etc.

The shape, the number, the distribution and the dimensions of the retaining tabs 22, 22' can differ from those illustrated.

Instead of a groove 23, the retaining tabs 22, 22' can be provided with a step radially projecting outwards to be fastened behind the step 19. It is possible to provide that the step of certain tabs bears against the front face of the step 19, and that other tabs bear against the rear face of the step 19.

The shape and the dimensions of the step 19 can differ from that illustrated. The angles formed by the faces 19.1, 19.2 of the step 19 with the central axis of the main body 21 can, in particular, not be equal to and/or be different from those illustrated in FIG. 6. In particular, the angle formed between the front face 19.1 and the central axis can be comprised:

- between 4 and 45 degrees, so as to form a so-called "smooth" slope and thus, more or less facilitate the mounting of the heat shield 20 on the torque tube 12; or
- between 45 and 90 degrees so as to form a so-called "strong" slope and thus make the mounting of the heat shield 20 on the torque tube 12 more or less difficult.

Similarly, the angle formed between the rear face 19.2 and the central axis can be comprised:

- between 5 and 45 degrees, so as to more or less facilitate the dismounting of the heat shield 20; or
- between 45 and 90 degrees, so as to make the dismounting of the heat shield 20 more or less difficult.

Conversely, a recess can be made in the inner surface of the torque tube 12 and the retaining tabs 22, 22' can be provided with a step radially projecting outwards to penetrate into said recess and ensure the immobilisation of the heat shield 20 in the torque tube 12.

The retaining tabs can be cut in the tubular body withdrawn from the edge of it.

Although, in this case, the retaining tabs 22, 22' are formed integrally with the main body 21, they can also be applied to said main body 21.

The number, the shape and the placement of the stiffener 24 can be different from that illustrated in FIG. 6.

The invention claimed is:

1. A braking device for braking an aircraft wheel, a hub of which is mounted rotatably on an axle, the braking device comprising:
   - a stack of discs threaded on a torque tube which is attached to the axle and equipped internally with a heat shield extending opposite an outer surface of the hub facing the stack of discs to protect said hub from heat radiation generated by the stack of discs,
   - wherein the heat shield comprises a tubular body which is coaxial to the torque tube and a plurality of retaining tabs which are resiliently deformable and secured to the tubular body, each of the retaining tabs and an inner surface of the torque tube comprising additional raised portions to engage with one another so as to axially immobilize the heat shield inside the torque tube.

2. The braking device according to claim 1, wherein the tubular body extends from a web of the wheel and a free edge of the hub.

3. The braking device according to claim 2, wherein the tubular body comprises spherical cap-shaped stamps facing the inner surface of the torque tube to form punctual contacts with said inner surface of the torque tube.

4. The braking device according to claim 1, wherein the retaining tabs are evenly distributed about a central axis of the tubular body.

5. The braking device according to claim 1, wherein the inner surface of the torque tube comprises a radially projecting step and each of the retaining tabs comprises a fastening raised portion of the radially projecting step.

6. The braking device according to claim 5, wherein the retaining tabs comprise a transverse groove arranged to simultaneously engage with a front face and a rear face of the radially projecting step.

7. The braking device according to claim 6, wherein the transverse groove has a depth less than a height of the radially projecting step, such that the retaining tabs are removed from the inner surface of the torque tube.

8. The braking device according to claim 6, wherein the retaining tabs comprise an inclined end portion forming a ramp on which the radially projecting step bears and slides during an introduction of the heat shield in the torque tube by causing a resilient deformation of the retaining tabs until passing the radially projecting step.

9. The braking device according to claim 5, wherein the retaining tabs define a diameter less than an inner diameter of the torque tube and greater than the outer diameter of the tubular body.

10. The braking device according to claim 1, wherein at least one of the retaining tabs is formed integrally with the tubular body.

11. An aircraft wheel equipped with the braking device according to claim 1.

12. An aircraft landing gear comprising at least one aircraft wheel according to claim 11.

13. An aircraft comprising at least one aircraft landing gear according to claim 12.

* * * * *